(12) United States Patent
Mukai

(10) Patent No.: US 6,446,095 B1
(45) Date of Patent: Sep. 3, 2002

(54) DOCUMENT PROCESSOR FOR PROCESSING A DOCUMENT IN ACCORDANCE WITH A DETECTED DEGREE OF IMPORTANCE CORRESPONDING TO A DATA LINK WITHIN THE DOCUMENT

(75) Inventor: Masaki Mukai, Izumisano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/260,053

(22) Filed: Mar. 2, 1999

(30) Foreign Application Priority Data

Jun. 9, 1998 (JP) .......................... 10-160117

(51) Int. Cl.[7] .............................. G06F 17/21
(52) U.S. Cl. .................... 707/501.1; 707/526
(58) Field of Search .................. 707/501.1, 513, 707/515, 530, 526

(56) References Cited

U.S. PATENT DOCUMENTS

| | | | | |
|---|---|---|---|---|
| 5,806,077 A | * | 9/1998 | Wecker | 707/501.1 |
| 5,845,084 A | * | 12/1998 | Cordell et al. | 709/234 |
| 5,870,769 A | * | 2/1999 | Freund | 707/501.1 |
| 5,896,502 A | * | 4/1999 | Shieh et al. | 709/224 |
| 6,023,701 A | * | 2/2000 | Malik et al. | 707/10 |
| 6,037,935 A | * | 3/2000 | Bates et al. | 345/760 |
| 6,154,752 A | * | 11/2000 | Ryan | 707/501.1 |
| 6,275,829 B1 | * | 8/2001 | Angiulo et al. | 707/104.1 |
| 6,324,553 B1 | * | 11/2001 | Cragun et al. | 707/513 |

* cited by examiner

Primary Examiner—Stephen S. Hong
(74) Attorney, Agent, or Firm—Wenderoth, Lind & Ponack, L.L.P.

(57) ABSTRACT

A document processor in which a document storage member stores link data and documents composed of texts and link information associated with the link data, comprising: a document gain member for gaining a specific document or a link data segment from the document storage member; a temporary document storage member for storing the specific document or the link data segment; a conditional storage member for storing degrees of importance of link data in association with attributes of the link data; a graphic producing member for producing a predetermined graphic in accordance with a degree of importance of the link data segment; a document display member for displaying texts in the specific document and the predetermined graphic; and a document display commanding member for instructing the document display member to display the texts in the specific document and the predetermined graphic simultaneously.

14 Claims, 14 Drawing Sheets

Fig.1
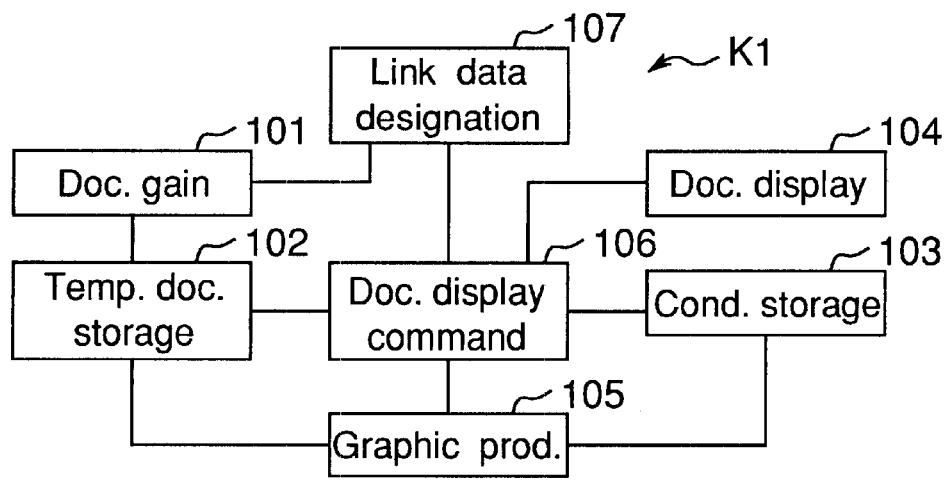
Fig.2
| Pattern of name | Degree of importance |
|---|---|
| "dot.*" | 1 |
| "ball.*" | 1 |
| "bullet.*" | 1 |
| Unknown, Other | 2 |
Fig.3
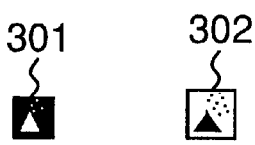

Fig.5

```
501  <HTML>
502  <BODY>
503
504  <P>Typical drawing</P>
505  <CENTER>
506  <P><IMG SRC="FIG1.GIF"></P>
507  </CENTER>
508
509  <P>Effects of the invention</P>
510  <CENTER>
511  <TABLE BORDER="0">
512  <TR><TD><IMG SRC="DOT.GIF"></TD><TD>Displayed rapidly.</TD></TR>
513  <TR><TD><IMG SRC="DOT.GIF"></TD><TD>Displayed beautifully.</TD></TR>
514  <TR><TD><IMG SRC="DOT.GIF"></TD><TD>Displayed accurately.</TD></TR>
515  </TABLE>
516  </CENTER>
517
518  </BODY>
519  </HTML>
```

Fig.6

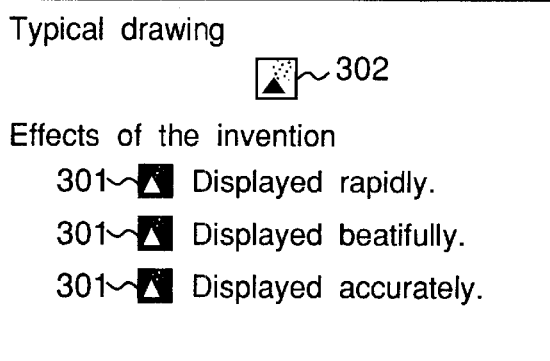

| Pattern of name | Number of times |
|---|---|
| "line.*" | 2 |
| "logo.*" | 1 |
| "new.*" | 5 |
| ... | ... |

| Pattern of name | Degree of importance |
|---|---|
| "dot.*" | 1 |
| "ball.*" | 1 |
| "bullet.*" | 1 |
| "new.*" | 1 |
| Unknown, Other | 2 |

Fig.18

| Width and height | Degree of importance |
|---|---|
| width>300 \| \| height>200 | 1 |
| Unknown, Other | 2 |

Fig.19 PRIOR ART

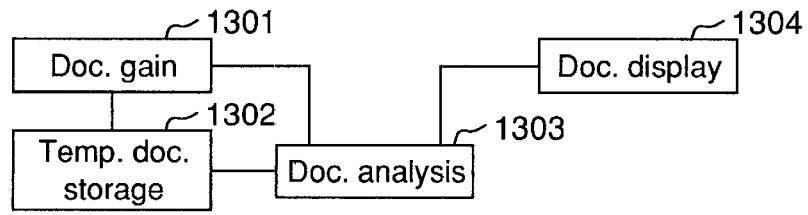

Fig.20 PRIOR ART

```
1401  <HTML>
1402  <BODY>
1403
1404  <P>Typical drawing</P>
1405  <CENTER>
1406  <P><IMG SRC="FIG1.GIF"></P>
1407  </CENTER>
1408
1409  <P>Effects of the invention</P>
1410  <CENTER>
1411  <TABLE BORDER="0">
1412  <TR><TD><IMG SRC="DOT.GIF"></TD><TD>Displayed rapidly.</TD></TR>
1413  <TR><TD><IMG SRC="DOT.GIF"></TD><TD>Displayed beautifully.</TD></TR>
1414  <TR><TD><IMG SRC="DOT.GIF"></TD><TD>Displayed accurately.</TD></TR>
1415  </TABLE>
1416  </CENTER>
1417
1418  </BODY>
1419  </HTML>
```

DOCUMENT PROCESSOR FOR PROCESSING A DOCUMENT IN ACCORDANCE WITH A DETECTED DEGREE OF IMPORTANCE CORRESPONDING TO A DATA LINK WITHIN THE DOCUMENT

BACKGROUND OF THE INVENTION 1. (Field of the Invention)

The present invention relates to a document processor which gains documents via networks and displays the documents.

2. (Description of the Prior Art)

In recent years, internet is rapidly widely used in response to progress of network technologies, development of standardization of various standards, drop of price of personal computers, etc. In internet, viewing of multimedia documents through networks, which is called a "World Wide Web (WWW)", is performed widely.

Software for performing this viewing is called "WWW browser" or "viewing software (viewer)" (referred to as "viewing software", hereinafter). As shown in FIG. 19, the viewing software has a configuration including a document gain means 1301, a temporary document storage means 1302, a document analysis means 1303 and a document display means 1304. The document gain means 1301 gains documents through a network from a document storage means (not shown) for storing documents composed of texts and link information on image and sound data as well as non-text data such as images and sounds. The temporary document storage means 1302 stores the documents which have been gained by the document gain means 1301. The document analysis means 1303 analyzes the documents stored in the temporary document storage means 1302 and instructs the document display means 1304 to display the documents or instructs the document gain means 1301 to gain data based on designation information on other data contained in the documents.

One concrete example of operation of the viewing software shown in FIG. 19 is described below. In this example, the document gain means 1301 gains a document 14 (FIG. 20) stored in the document storage means. The document 14 is formed by texts of 19 lines 1401 to 1419. The line 1406 contains link information on image data named "FIG1.GIF", (referred to as an "image A", hereinafter), while the lines 1412, 1413 and 1414 contain link information on image data named "DOT.GIF", (referred to as an "image B", hereinafter). The document gain means 1301 gains the document 14 and the temporary document storage means 1302 stores the document 14. The document analysis means 1303 analyzes the document 14. In case the document analysis means 1303 has judged that the document 14 contains the link information on the image A and the link information on the image B, the document analysis means 1303 instructs the document gain means 1301 to gain these image data from the document storage means through the network. When the document gain means 1301 has gained the images A and B and the temporary document storage means 1302 has stored these image data, the document display means 1304 displays, by instructions from the document analysis means 1303, the previously gained document 14 together with the images A and B. The document 14 and the images A and B displayed by the document display means 1304 are conceptually shown in FIG. 21. The image B is associated with three locations of the document 14 and thus, the three images B are displayed on the screen.

Generally, since non-text data such as images is larger in size than text data, time for gaining the non-text data from the document storage means and communication cost of the non-text data become large. Hence, there are viewing softwares in which in case capacity of a communication path is small or communication cost per unit time or unit data quantity is large, only documents of texts are gained unless otherwise instructed by a user in order to minimize quantity of data gained from the document storage means. When this viewing software is employed, the document 14 is displayed as shown in FIG. 22 in which a predetermined identical graphic is displayed at each of portions corresponding to the images. In many of these viewing softwares, only when this graphic has been designated by the user, corresponding image data is gained from the document storage means and is displayed by the document display means.

However, in the above mentioned known method in which the image data is gained from the document storage means on the basis of link information on the image data and is displayed together with the previously gained document, since the image data corresponding to the whole link information is gained, the following problems (1) and (2) arise.

(1) Both images important for the user and images unimportant for the user are gained from the document storage means. Thus, if the image data includes the images unimportant for the user, time required for gaining these unimportant images and communication cost for the unimportant images are useless.

(2) Likewise, if the user has gained the images unimportant for the user, time required for displaying these unimportant images is useless.

Meanwhile, in the above described conventional method in which only the documents of the texts are usually gained so as to be displayed and one predetermined identical graphic is designated by the user so as to be displayed, the different images are displayed by the identical graphic and thus, the following inconveniences (1) and (2) are incurred.

(1) Since both the images important for the user and the images unimportant for the user are displayed by the identical graphic, the user cannot recognize which ones of the images are important for the user. Consequently, if the user has gained the image data unimportant for the user, time required for gaining the unimportant image data and communication cost for the unimportant image data are useless.

(2) Similarly, if the user has gained the images unimportant for the user, operation for gaining these unimportant images and time required for displaying the unimportant images are useless.

SUMMARY OF THE INVENTION

Accordingly, an essential object of the present invention is to provide, with a view to eliminating the above mentioned drawbacks of conventional document processors, a document processor in which at the time a document of texts has been gained, degrees of importance of data such as images and sounds are judged by their names, etc. and only data having degrees of importance higher than a predetermined degree of importance is gained from a document storage means so as to reduce gains of images and sounds, etc. unimportant for a user such that time required for gaining the data and communication cost of the data are lessened.

Another important object of the present invention is to provide a document processor in which at the time a document of texts has been gained, degrees of importance of link data on images are judged by their names and graphics are displayed in accordance with the degrees of importance so as to reduce gains of images and sounds, etc. unimportant for a user such that time required for gaining the link data and communication cost of the link data are lessened.

In order to accomplish these objects of the present invention, a document processor in which a document storage means stores link data and documents composed of texts and link information associated with the link data, according to the present invention comprises: a document gain means for gaining a specific document or a link data segment from the document storage means; a temporary document storage means for storing the specific document or the link data segment; a conditional storage means for storing degrees of importance of link data in association with attributes of the link data; a graphic producing means for producing a predetermined graphic in accordance with a degree of importance of the link data segment; a document display means for displaying texts in the specific document and the predetermined graphic; and a document display commanding means for instructing the document display means to display the texts in the specific document and the predetermined graphic simultaneously.

In accordance with the present invention, since the importance of the link data segment corresponding to each link information is judged in accordance with the link information contained in the specific document and contents of the conditional storage means and different graphics corresponding to degrees of importance, respectively are displayed by the document display means, a user can judge whether the link data segment is unimportant for the user, so that time required for gaining the unimportant link data segment and communication cost for the unimportant link data segment can be reduced.

Meanwhile, if a link data designating means instructs, by designating the predetermined graphic, the document gain means to gain the link data segment and the link data segment is displayed by the document display means, reference can be made on the document to only the link data segment judged by the user to be important.

BRIEF DESCRIPTION OF THE DRAWINGS

These objects and features of the present invention will become apparent from the following description taken in conjunction with the preferred embodiments thereof with reference to the accompanying drawings in which:

FIG. 1 is a block diagram of a document processor according to a first embodiment of the present invention;

FIG. 2 is a conceptual view showing contents of a conditional storage means employed in the document processor of FIG. 1 and a document processor according to a second embodiment of the present invention;

FIG. 3 is a conceptual view showing graphics produced by a graphic producing means employed in the document processor of FIG. 1;

FIG. 5 is a view showing an example of a document gained by a document gain means employed in the document processor of FIG. 1;

FIG. 6 is a view showing an example of display of a document display means employed in the document processor of FIG. 1;

FIG. 18 is a conceptual view showing contents of a conditional storage means employed in the document processor of FIG. 17;

FIG. 19 is a block diagram showing a configuration of a conventional viewing software (already referred to);

FIG. 20 is a view showing an example of a document gained by a document gain means of the conventional viewing software of FIG. 19 (already referred to);

Before the description of the present invention proceeds, it is to be noted that like parts are designated by like reference numerals throughout several views of the accompanying drawings.

DETAILED DESCRIPTION OF THE INVENTION

Figure 4:
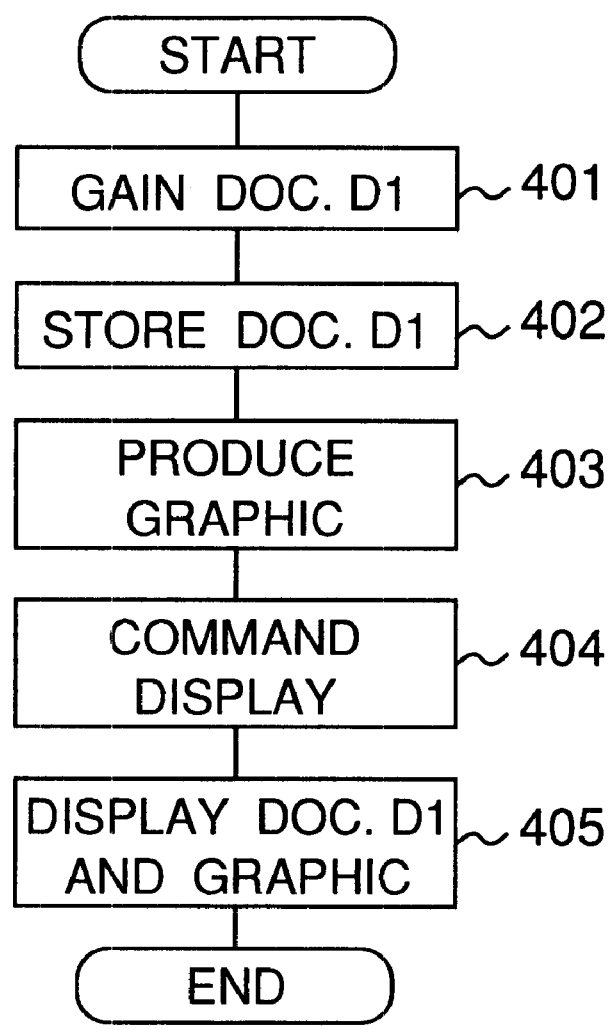
FIG. 4 is a flowchart showing operation of the document processor of FIG. 1.

Hereinafter, embodiments of the present invention are described in detail with reference to the drawings.
(First Embodiment)

FIG. 1 shows a document processor K1 according to a first embodiment of the present invention. The document processor K1 includes a document gain means 101, a temporary document storage means 102, a conditional storage means 103, a document display means 104, a graphic producing means 105, a document display commanding means 106 and a link data designating means 107.

The document gain means 101 gains documents of texts and link data such as images and sounds stored in a document storage means (not shown) connected to the document gain means 101 by a network. The documents and the data such as the images and the sounds which should be gained are designated by a user. The temporary document storage means 102 temporarily stores for display, etc. the documents and the data such as the images and the sounds which have been gained by the document gain means 101. The conditional storage means 103 stores conditions for judging degrees of importance of data associated with each other by link information contained in the documents. The link information is associated with the link data. In this embodiment, the conditional storage means 103 stores conditions shown in FIG. 2. In FIG. 2, patterns of names of the data associated with each other by the link information are utilized as the conditions for judging degrees of importance of the data associated with each other by the link information, which is based on a user's empirical comprehension that data having names of specific patterns are mostly unimportant, namely, gain of such data is mostly useless. For example, data having a pattern of a name coincident with "dot.*", i.e., data having a character string starting with "dot.", for example, "dot.gif" and "dot.bmp" has a degree "1" of importance. Likewise, data having patterns of names coincident with "ball.*" and "bullet.*" have the degree "1" of importance. Data having names of other patterns than those referred to above or data whose names are unknown have a degree "2" of importance. At this time, discrimination between capital letter and small letter in alphabets appearing in the patterns such as "dot.*" is not performed. Namely, data having a name "DOT.GIF" also has the degree "1" of importance. It is to be noted here that the degree of importance increases in an ascending order of numeral of the degree of importance.

The document display means 104 outputs the documents of the texts or the images, the sounds, etc. in accordance with a command from the document display commanding means 106. The graphic producing means 105 judges, based on the link data in the documents stored by the temporary document storage means 102 and contents of the conditional storage means 103, degrees of importance of data corresponding to the link data and produces graphics preliminarily determined in accordance with the degrees of importance. More specifically, the graphic producing means 105 produces graphics for the data corresponding to the link information, respectively, in accordance with their degrees of importance as shown in FIG. 3. In FIG. 3, a graphic 301 has the degree "1" of importance and a graphic 302 has the degree "2" of importance. The document display commanding means 106 instructs the document display means 104 to display contents of the documents stored in the temporary document storage means 102 and the graphics produced by the graphic producing means 105. By designating graphics corresponding to the link data such as the images and the sounds, which graphics are displayed by the document display means 104, the link data designating means 107 instructs the document gain means 101 to gain the link data from the document storage means.

Hereinafter, operational sequence in which the document gain means 101 gains a document via the network in the document processor K1 is described with reference to a flowchart of FIG. 4. Initially, the document gain means 101 gains a document D1 from the document storage means at step 401 and then, the program flow proceeds to step 402 at which the temporary document storage means 102 stores the document D1. Subsequently, at step 403, by using names in link information contained in the document D1 and contents of the conditional storage means 103, the graphic producing means 105 judges degrees of importance of data corresponding to the link information, respectively and produces the graphic 301 or 302 in accordance with the degrees of importance. Then, at step 404, the document display commanding means 106 instructs, based on the document D1 and the graphic produced by the graphic producing means 105, the document display means 104 to display the document D1 and the graphic. Finally, at step 405, the document display means 104 displays the document D1 and the graphic under instructions from the document display commanding means 106. Thus, operation of the document processor K1 has been completed.

By the above described procedures, the graphics determined in accordance with the degrees of importance corresponding to the link information in the document D1 are displayed together with text data by the document display means 104. Since the graphics corresponding to the degrees of importance are displayed on the document display means 104, the user can judge, by referring to these graphics, whether data such as the corresponding images should be gained.

For example, in the document processor K1, processings in which the document gain means 101 gains a document 51 shown in FIG. 5 are as follows.

(1) The document gain means 101 gains the document 51.

(2) The temporary document storage means 102 stores the document 51.

(3) By using link information in the document 51, <IMG SRC="FIG1.GIF"> (i.e., image data named "FIG1.GIF") and <IMG SRC="DOT.GIF"> (i.e., image data named "DOT.GIF" at three locations) and contents of the conditional storage means 103 shown in FIG. 2, the graphic producing means 105 judges the degrees of importance of the former and latter image data as "2" and "1", respectively and produces the corresponding graphics 302 and 301.

(4) The document display means 104 performs display shown in FIG. 6.

Figure 7A:
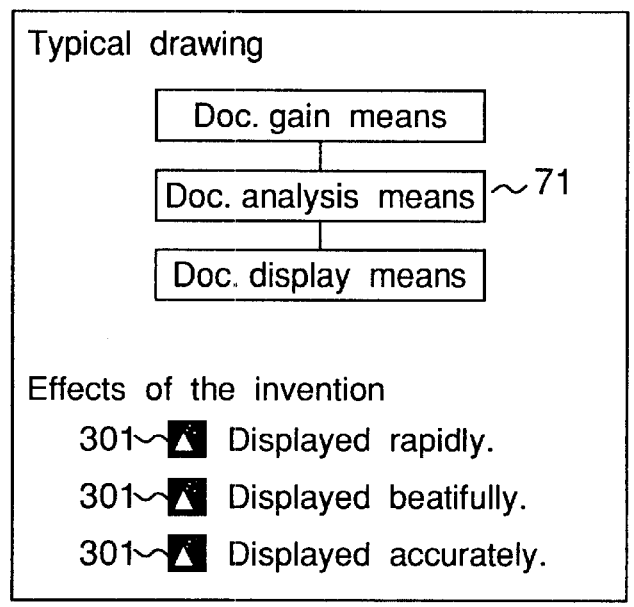
FIG. 7A is a view showing a further example of display of the document display means of FIG. 6.
Figure 7B:
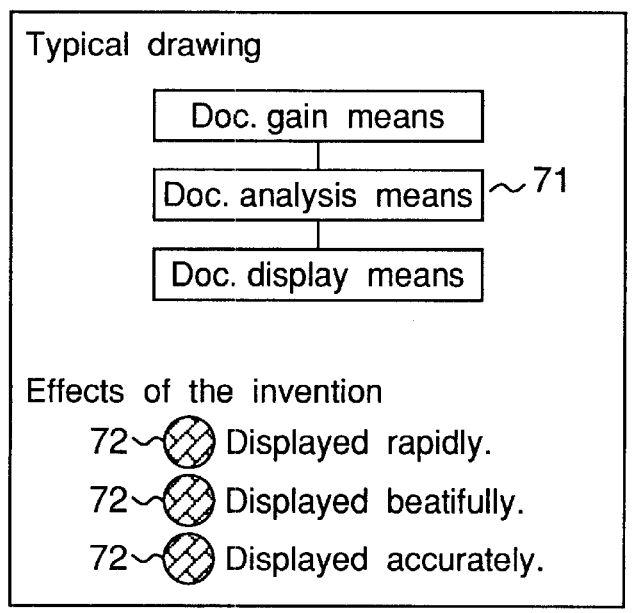
FIG. 7B is a view showing a still further example of display of the document display means of FIG. 6.

At this time, if the link data designating means 107 instructs the document gain means 101 to gain link data corresponding to the graphic 302, the document gain means 101 gains this link data and the document display means 104 performs display shown in FIG. 7A. Meanwhile, FIG. 7B shows another example of display of the document display means 104. In FIG. 7B, image data corresponding to all the link information in the document 51 is gained from the document storage means and is displayed. A graphic 71 is essentially significant but a graphic 72 is a circular image for merely indicating an item.

As will be seen from FIGS. 6, 7A and 7B of the first embodiment, the image considered to be not so important and the image considered to be essentially significant are, respectively, judged to have the low degree "1" of importance and the high degree "2" of importance such that the graphics corresponding to the degrees of importance, respectively are displayed. By referring to these graphics, the user can decide whether data such as the corresponding images should be gained.

As described above in the first embodiment, since the graphic corresponding to the data considered to be unimportant and the graphic corresponding to other data are differently displayed based on the user's empirical comprehension that the data having names of specific patterns are mostly unimportant, the data considered to be unimportant can be displayed discriminatingly at the time the documents of the texts have been gained. Therefore, gain of the useless data by the user can be lessened.

Meanwhile, in this embodiment, the two degrees of importance are provided and the graphics corresponding to the two degrees of importance are displayed. However, it is needless to say that thee or more degrees of importance may be provided such that graphics corresponding to the degrees of importance are displayed.

Furthermore, in this embodiment, the images are associated with the link information in the document. However, non-text data such as sounds and animation may also be associated with the link information in the document.

Figures 8, 9, 10:
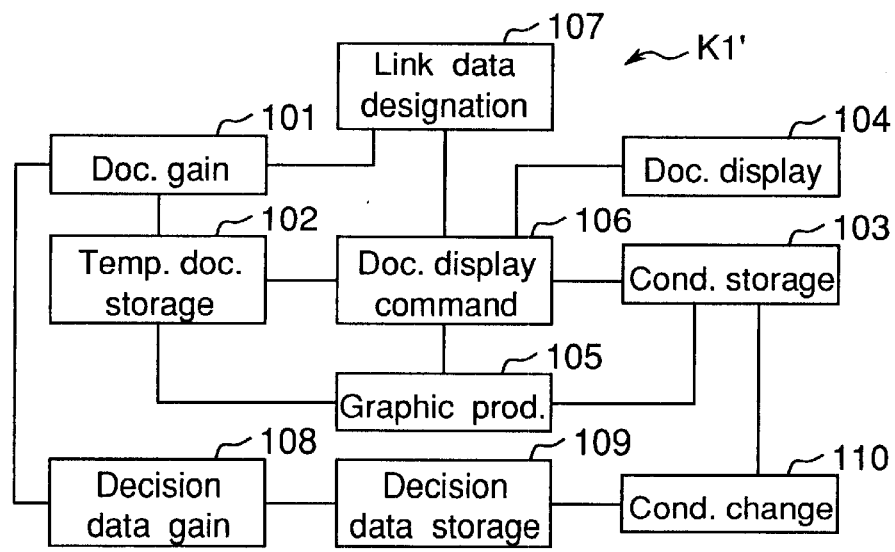
FIG. 8 is a block diagram showing a modification of the document processor of FIG. 1.
FIG. 9 is a conceptual view showing contents of a decision data storage means employed in the document processor of FIG. 8.
FIG. 10 is a conceptual view showing contents of a conditional storage means employed in the document processor of FIG. 8.

In addition, in this embodiment, the patterns of the names of the data set by the user are utilized as the conditions stored by the conditional storage means. However, it is also possible to employ such an arrangement in which the document processor itself controls record of operation of the user. In this arrangement, when the user gained and displayed data and within a short period thereafter, gains and displays another document or other data, it is judged that the former data is considered to be not so important such that conditions stored in the conditional storage means are updated automatically. For example, a configuration shown in FIG. 8 illustrating a modification K1' of the document processor K1 may be employed to this end. In addition to the elements 101 to 107 of the document processor K1 of FIG. 1, the modified document processor K1' includes a decision data gain means 108, a decision data storage means 109 and a conditional change means 110. In case the document gain means 101 gained non-text data and within 2 sec. thereafter, starts gaining another document or another non-text data, the decision data gain means 108 judges that a degree of importance of the former non-text data is possibly low and extracts a character string preceding a period (".") in the name. Then, the decision data gain means 108 changes to small letters, all capital letters of alphabets contained in the character string and causes the decision data storage means 109 to store the character string in a format described below.

The decision data storage means 109 stores information having a format shown in FIG. 9. FIG. 9 indicates that the decision data gain means 108 has judged so far from a predetermined time point twice that a degree of importance of non-text data having a name of a pattern "line.*" is possibly low, similarly, once that a degree of importance of non-text data having a name of a pattern "logo.*" is possibly low and five times that a degree of importance of non-text data having a name of a pattern "new.*" is possibly low. In response to setting of the conditional decision data to the decision data storage means 109 by the decision data gain means 108, the conditional change means 110 stores in the conditional storage means 103 that the non-text data whose degree of importance has been judged not less than five times to be possibly low has the degree "1" of importance. More specifically, the modified document processor K1' is operated as follows.

(1) The document gain means 101 gains image data i3 having a name "new.gif". from the document storage means.
(2) One sec. after gain of the image data i3, the document gain means 101 starts gaining another document by instructions from the user.
(3) The decision data gain means 108 judges that the degree of importance of the pattern "new.*" of the name is possibly low and increases record of the number of times of the pattern "new.*" of the name in the decision data storage means 109 by one. As a result, the number of times of the pattern "new.*" of the name reaches five as shown in FIG. 9.
(4) Based on the contents (FIG. 9) of the decision data storage means 109, the conditional change means 110 stores in the conditional storage means 103 that the non-text data having the name of the pattern "new.*" has the degree "1" of importance. At this time, contents of the conditional storage means 103 are as shown in FIG. 10.

Thereafter, it is judged that the non-text data having the name of the pattern "new.*" has the degree "1" of importance and a graphic corresponding to the link of this non-text data is the graphic 301.

Meanwhile, such an arrangement may also be employed in which in response to increase of the number of times in FIG. 9, the degree of importance of the corresponding pattern is gradually lowered.

Figure 11:
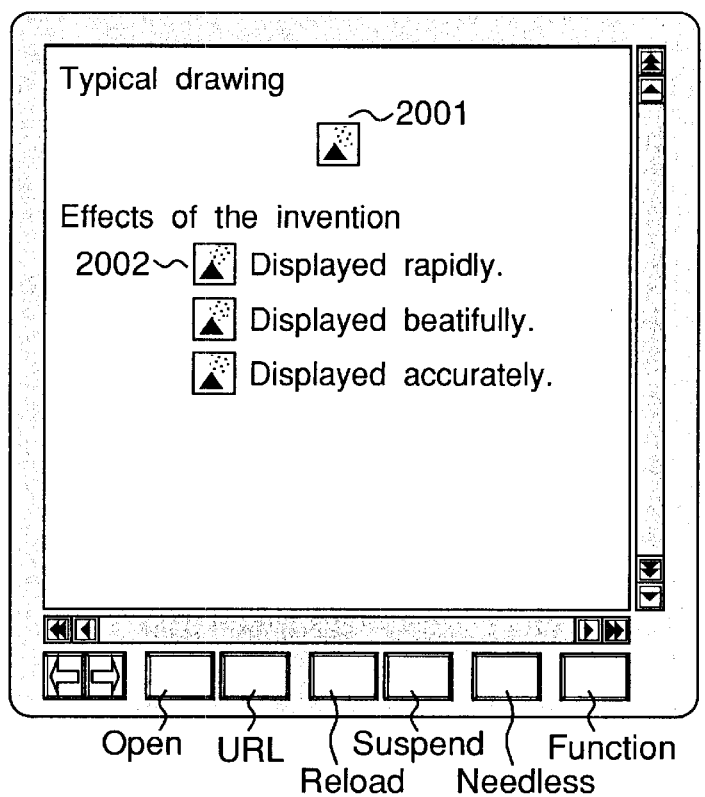
FIGS. 11 to 13 are views showing examples of display of a screen of the document processor of FIG. 8, respectively.
Figure 12:
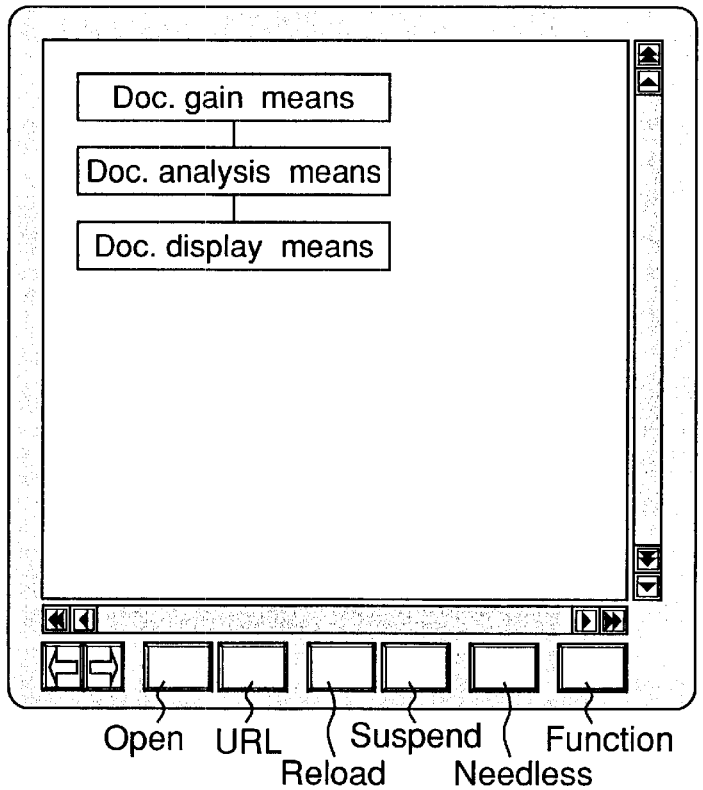
Figure 13:
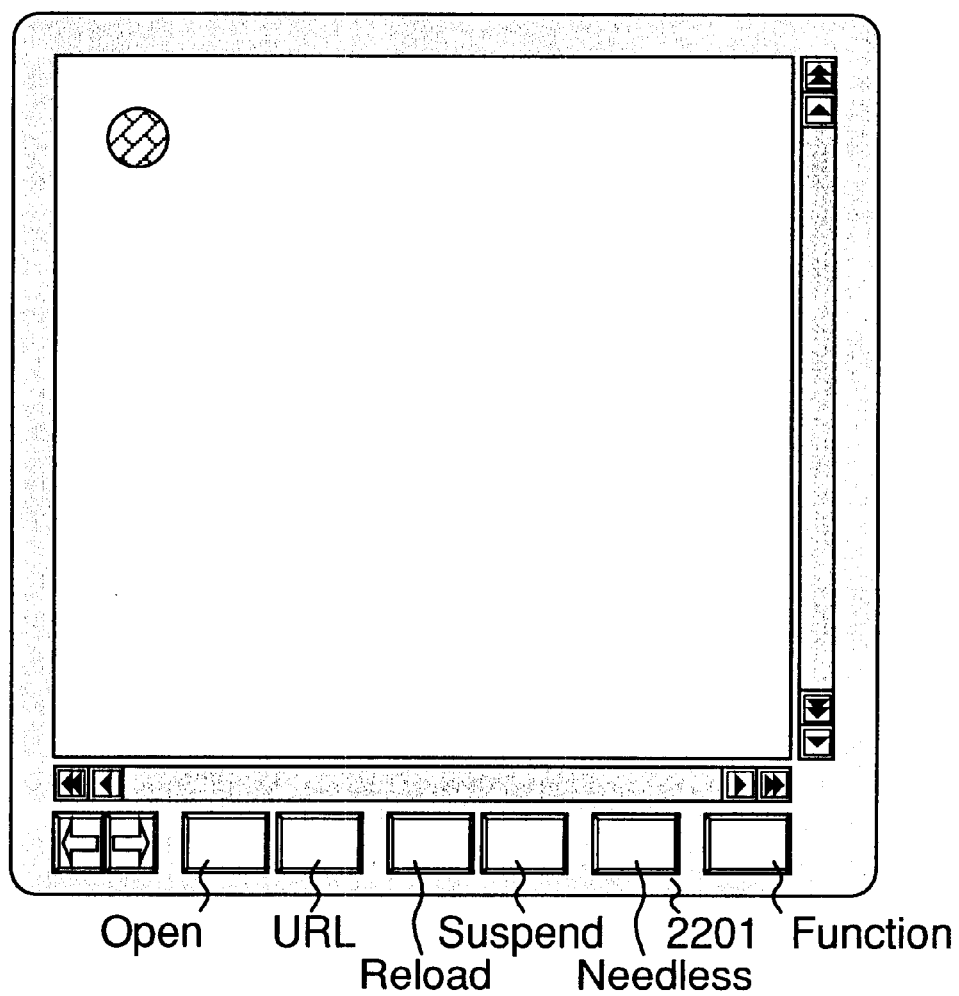

Furthermore, in place of the above mentioned scheme in which the decision data gain means 108 automatically updates the contents of the decision data storage means 109 on the basis of the period from gain of the non-text data to start of gain of another document, such an arrangement may be employed in which the contents of the decision data storage means 109 are updated by the user's judgement that the degree of importance is low and operation of passing this judgement. In this case, examples of display of a screen of the document processor K1' are shown in FIGS. 11 to 13. In FIG. 11, not only a document similar to that shown in FIG. 6 is displayed but operational buttons for displaying another document, displaying a document through its scrolling, etc. are shown. Graphics 2001 and 2002 in FIG. 11 correspond to non-text data. When a user designates the graphic 2001 in FIG. 11, an image corresponding to the graphic 2001 is gained and displayed as shown in FIG. 12. On the other hand, when the user designates the graphic 2002 in FIG. 11, an image corresponding to the graphic 2002 is displayed as shown in FIG. 13. The decision data gain means 108 is adapted to update the contents of the decision data storage means 109 on the basis of a "Needless" button 2201 of FIG. 13 and a name of non-text data displayed upon selection of the "Needless" button 2201. In FIG. 13, the image corresponding to the graphic 2002 is gained and displayed but is merely a sign for indicating an item. Supposing that the user has judged that the image corresponding to the graphic 2002 is not so important, the user can inform the document processor K1' by selecting the "Needless" button 2201 that this non-text data is unimportant. As a result, the decision data gain means 108 updates the contents of the decision data storage means 109 by using the name of the displayed non-text data.

In addition, without utilizing the names of the data as the conditions for judging the degrees of importance of the data, data sizes, dimensions such as width and height of the data in the document display means or kinds of the data may also be utilized as the conditions for judging the degrees of importance of the data.

(Second Embodiment)

Figure 14:
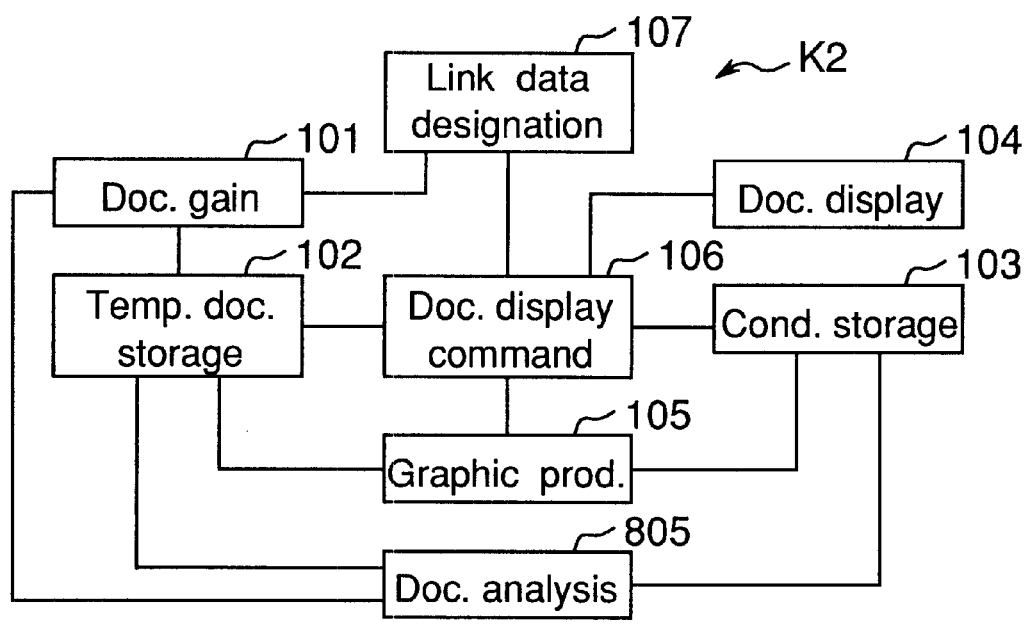
FIG. 14 is a block diagram of the document processor according to the second embodiment of the present invention.

FIG. 14 shows a document processor K2 according to a second embodiment of the present invention. In addition to the elements 101 to 107 of the document processor K1 of FIG. 1, the document processor K2 includes a document analysis means 805. In the document processor K2, conditions stored in the conditional storage means 103 are the same as those of the first embodiment of FIG. 2.

The document analysis means 805 judges, based on link information in documents stored in the temporary document storage means 102 and contents of the conditional storage means 103, degrees of importance of data corresponding to the link information and instructs the document gain means 101 to gain data having degrees not less than "2" of importance. Meanwhile, the document display commanding means 106 instructs the document display means 104 to output the documents and the data such as the images and the sounds stored in the temporary document storage means 102 as well as predetermined graphics corresponding to link information on data not stored in the temporary document storage means 102.

Figure 15:
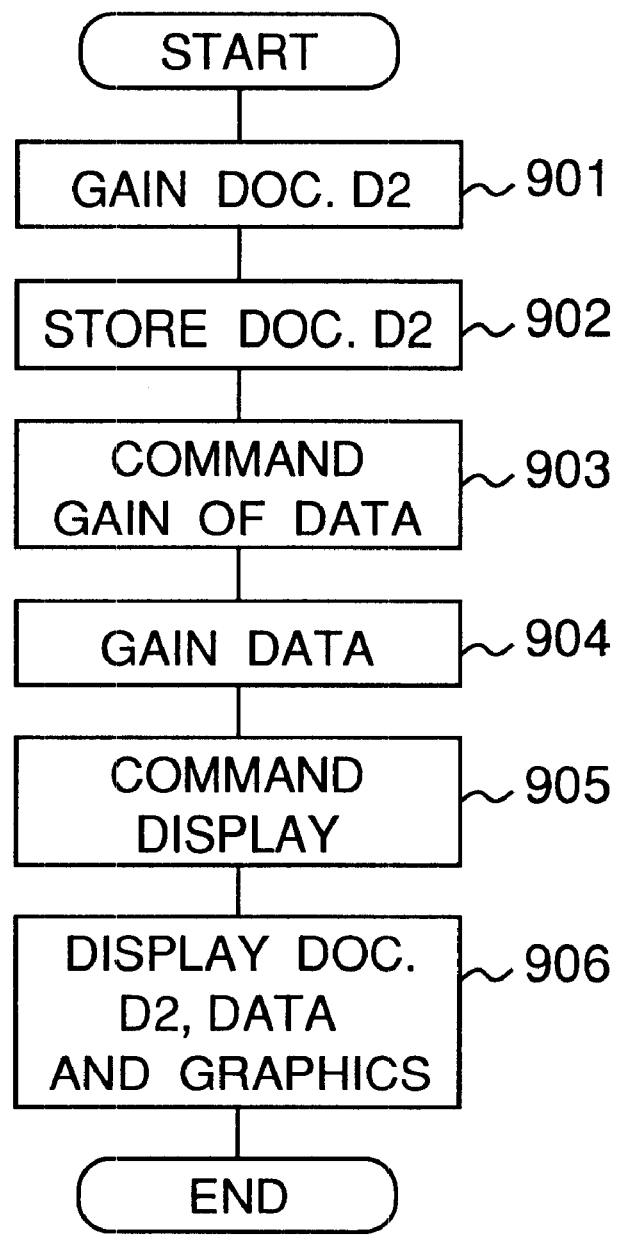
FIG. 15 is a flowchart showing operation of the document processor of FIG. 14.

Hereinafter, operational sequence in which the document gain means 101 gains a document via a network in the document processor K2 is described with reference to a flowchart of FIG. 15. Initially, the document gain means 101 gains a document D2 from the document storage means at step 901 and then, the program flow proceeds to step 902 at which the temporary document storage means 102 stores the document D2. Thereafter, at step 903, by using names in link information contained in the document D2 and contents of the conditional storage means 103, the document analysis means 805 analyzes degrees of importance corresponding to the link information, respectively and instructs the document gain means 101 to gain data d1 to dn having degrees not less than "2" of importance. Subsequently, at step 904, the document gain means 101 gains the data d1 to dn from the document storage means. Then, at step 905, the document display commanding means 106 instructs the document display means 104 to output the document D2 and the data stored in the temporary document storage means 102 as well as the graphics corresponding to the link information on the data not stored in the temporary document storage means 102. Finally, at step 906, the document display means 104 displays the document D2, the data and the graphics under instructions from the document display commanding means 106. Thus, operation of the document processor K2 has been completed.

By the above described procedures, only data corresponding to the degrees not less than "2" of importance for the link information in the document D2, respectively is automatically gained by the document gain means 101 and the data is displayed together with text data by the document display means 104. In data corresponding to the link information, data segments considered to be unimportant are not displayed and the predetermined graphics are displayed instead.

For example, in the document processor K2, processing in which the document gain means 101 gains the document 51 shown in FIG. 5 are as follows in the same manner as the document processor K1.

Figure 16:
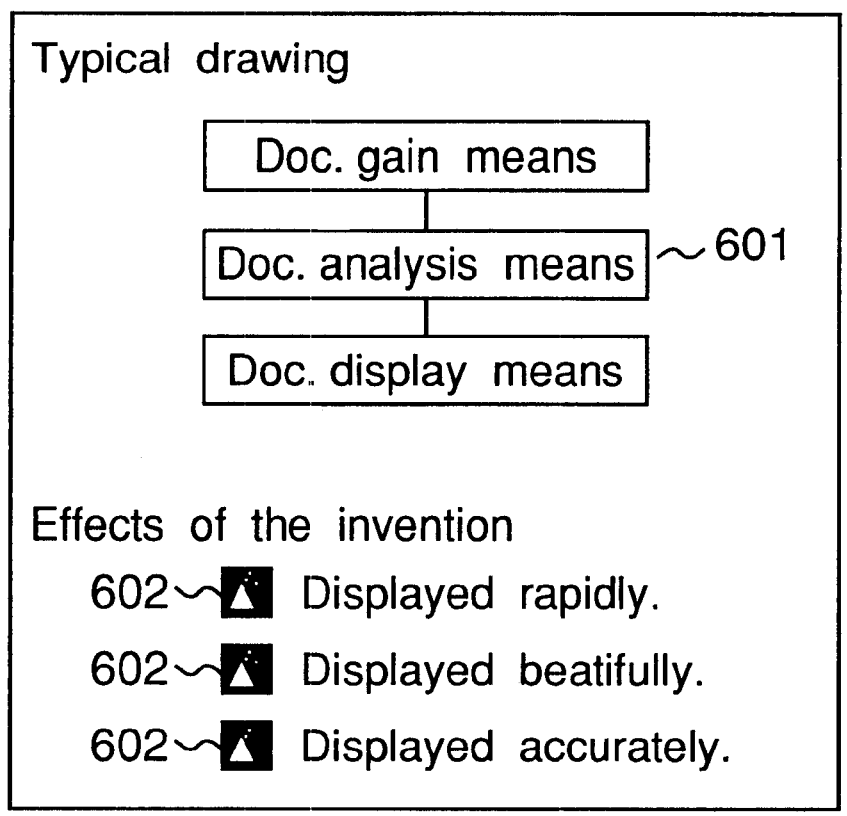
FIG. 16 is a view showing an example of display of a document display means employed in the document processor of FIG. 14.

(1) The document gain means 101 gains the document 51.
(2) The temporary document storage means 102 stores the document 51.
(3) By using link information in the document 51, <IMG SRC="FIG1.GIF"> (i.e., image data named "FIG1.GIF") and <IMG SRC="DOT.GIF"> (i.e., image data named "DOT.GIF" at three locations) and contents of the conditional storage means 103 shown in FIG. 2, the document analysis means 805 judges the degrees of importance of the former and latter image data as "2" and "1", respectively and instructs the document gain means 101 to gain only the former image data having the degree "2" of importance.
(4) The document gain means 101 gains the former image data corresponding to the link information <IMG SRC="FIG1.GIF"> from the document storage means.
(5) The temporary document storage means 102 stores the former image data corresponding to the link information <IMG SRC="FIG1.GIF"> from the document storage means.
(6) The document display commanding means 106 instructs the document display means 104 to display the document 51, the image data and graphics.
(7) The document display means 104 performs display shown in FIG. 16. In FIG. 16, contents of the image data having the degree "2" of importance, i.e. an image 601 is displayed but a graphic 602 is displayed for the image data having the degree "1" of importance instead of its image.

As will be seen from comparison between FIG. 7B in which image data corresponding to all the ink information in the document 51 is gained from the document storage means and is displayed and FIG. 16, the image considered to be not so important and the image considered to be essentially significant are, respectively, judged to have the low degree "1" of importance and the high degree "2" of importance in the second embodiment in the same manner as the first embodiment such that only the graphic having the high degree of importance is gained from the document storage means and is displayed.

As is clear from the foregoing description of the second embodiment, since the data considered to be unimportant based on the user's empirical comprehension that data having names of specific patterns are unimportant is not gained from the document storage means, the user can refer, without specific instructions, to only the data considered to be necessary. As a result, time required for gaining the unnecessary data and communication cost for the unnecessary data can be eliminated.

Meanwhile, also in the document processor K2, various modifications similar to those of the first embodiment can be employed.

(Third Embodiment)

Figure 17:
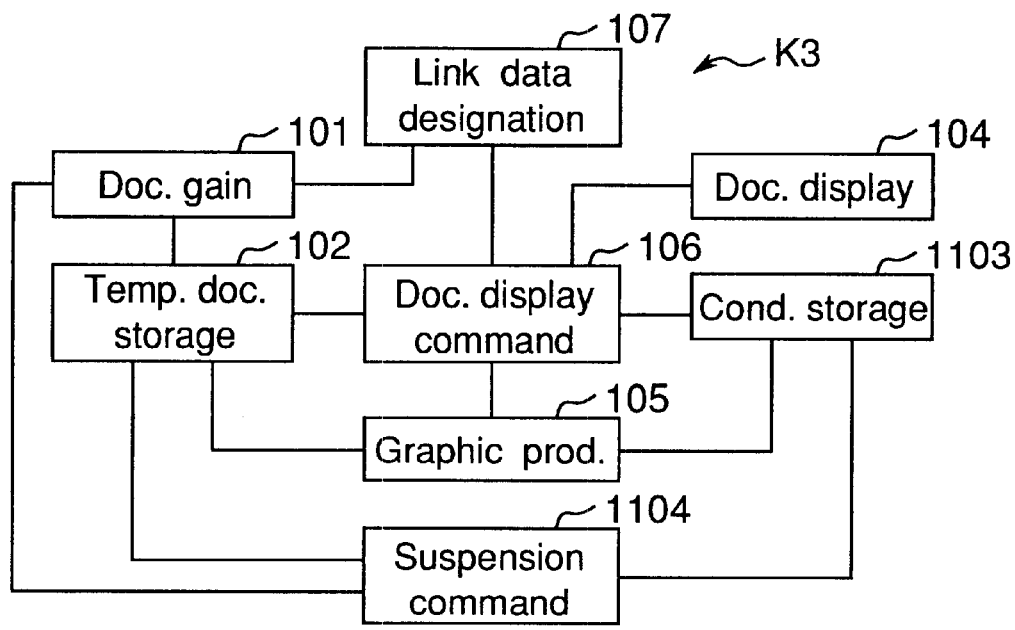
FIG. 17 is a block diagram of a document processor according to a third embodiment of the present invention.
Figure 21:
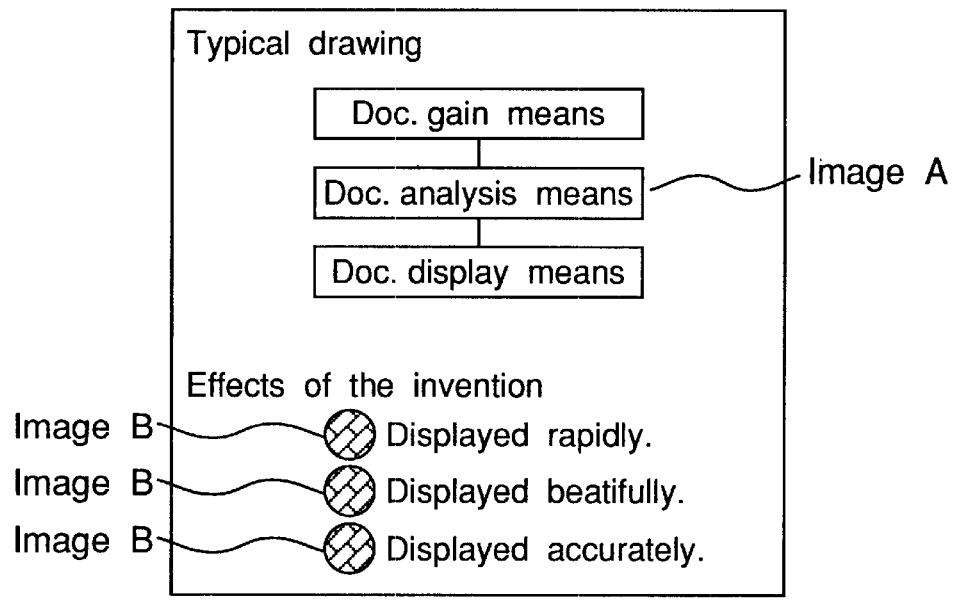
FIG. 21 is a view showing an example of display of a document display means of the conventional viewing software of FIG. 19 (already referred to)
Figure 22:
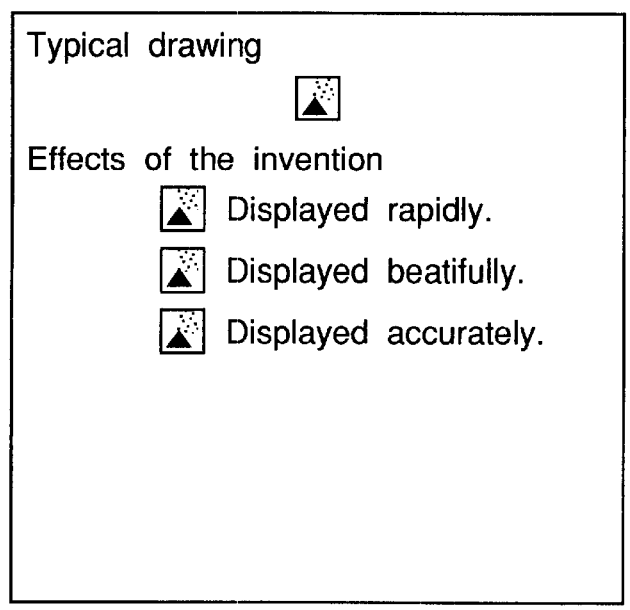
FIG. 22 is a view showing an example of display of a document display means of another conventional viewing software (already referred to).

FIG. 17 shows a document processor K3 according to a third embodiment of the present invention. In addition to the elements 101, 102 and 104 to 107 of the document processor K1 of FIG. 1, the document processor K3 includes a conditional storage means 1103 in place of the conditional storage means 103 of the document processor K1 and a suspension commanding means 1104 for commanding suspension of gain of data.

In the same manner as the conditional storage means 103 of the document processors K1 and K2, the conditional storage means 1103 stores conditions for judging degrees of importance of data associated with each other by link information contained in documents. In this embodiment, the conditional storage means 1103 stores conditions shown in FIG. 18. In FIG. 18, width and height of the data associated with each other by the link information are utilized as the conditions for judging degrees of importance of the data. Namely, image data having a width of more than 300 pixels or a height of more than 200 pixels has the degree "1" of importance, while image data having a width of not more than 300 pixels or a height of not more than 200 pixels or image data whose width or height is unknown has the degree "2" of importance. In the same manner as the first and second embodiments, the degree of importance increases in an ascending order of numeral of the degree of importance. In the document processor K3, since an image having a width of more than 300 pixels or a height of more than 200 pixels cannot be displayed as a whole by restriction of size of a screen, gain of such an image is mostly useless and thus, the conditions of FIG. 18 are designated.

The suspension commanding means 1104 judges degree of importance of image data at the time width or height of the image data has been obtained during gain of the image data by the document gain means 101 and instructs the document gain means 101 to suspend gain of the image data in case the suspension commanding means 1104 has judged the image data to have the degree "1" of importance.

Hereinafter, operational examples (A) and (B) in which the document gain means 101 of the document processor K3 gains image data i1 and i2, respectively are described. The operational examples (A) and (B) have steps (a1) to (a4) and (b1) to (b4), respectively.

[Operational Example (A)]

(a1) The document gain means 101 starts gaining the image data i1. While the document gain means 101 is gaining data, the temporary document storage means 102 stores the data.
(a2) While the document gain means 101 is gaining the image data i1, the suspension commanding means 1104 judges size of the image data i1 to be a width of 240 pixels and a height of 160 pixels.

(a3) By referring to contents of the conditional storage means 1103, the suspension commanding means 1104 judges the image data ia to have the degree "2" of importance.

(a4) The document gain means 101 completes gain of the image data i1.

[Operational example (B)]

(b1) The document gain means 101 starts gaining the image data i2. While the document gain means 101 is gaining data, the temporary document storage means 102 stores the data.

(b2) While the document gain means 101 is gaining the image data i2, the suspension commanding means 1104 judges size of the image data i2 to be a width of 480 pixels and a height of 20 pixels.

(b3) By referring to contents of the conditional storage means 1103, the suspension commanding means 1104 judges the image data i2 to have the degree "1" of importance. Since the image data i2 has the degree "1" of importance, the suspension commanding means 1104 instructs the document gain means 101 to suspend gain of the image data i2.

(b4) The document gain means 101 suspends gain of the image data i2.

As described above, in case width and height of image data to be gained fall within predetermined ranges, namely, the image data can be wholly displayed on the screen of the document processor K3, all the image data is gained. On the contrary, in case width and height of image data to be gained fall out of the predetermined ranges, the image data cannot be wholly displayed on the screen and thus, gain of the image data is suspended.

In the above mentioned third embodiment, if it is judged during gain of image data that the image data is not contained in the screen, gain of the image data is suspended. Therefore, such an undesirable situation can be eliminated that since all the image data which cannot be wholly displayed on the screen has been gained, gain of the image data is useless. Therefore, time required for gaining the data and communication cost for the data can be reduced.

Meanwhile, in the third embodiment, degree of importance of image data is determined based on width and height of the image data. However, in, for example, a document processor provided with a screen which is incapable of displaying color images, such an arrangement can be alternatively employed in which the color images cannot be displayed properly and thus, are set at a low degree of importance, while monochromatic images can be displayed properly and thus, are set at a high degree of importance. Furthermore, it is needless to say that setting of degree of importance is not restricted to the image data and thus, degree of importance can be set also for data such as sounds, etc.

Meanwhile, in the third embodiment, the non-text data is employed as the link data but the text data may be, needless to say, employed as the text data.

As is clear from the foregoing description of the present invention, the degree of importance of the link data is judged from the link information in the document and is shown to the user such that gain of the link data considered to be unimportant for the user is restrained. Likewise, from the link information in the document, the degree of importance of the corresponding link data is judged such that gain of the link data having the degree of importance lower than the predetermined degree of importance is not performed. Alternatively, in case the link data to be gained is judged to be unimportant, gain of the link data is suspended. Accordingly, in accordance with the present invention, since gain of the link data via the network can be restricted to a minimum necessary level, time required for gaining the link data and communication costs for the link data can be reduced.

What is claimed is:

1. A document processor for use with a document storage device capable of storing link data and at least one document comprising texts and link information associated with the link data, the link information including a data link segment, said document processor comprising:

a document gain means for gaining at least one of a document and link data from the document storage device;

a temporary document storage means for storing the at least one of the document and the link data;

a conditional storage means for storing a degree of importance of the link data corresponding to a name of a link data segment corresponding to the link data;

a graphic producing means for producing a predetermined graphic in accordance with the degree of importance of the link data;

a document display means for displaying texts in the document and the predetermined graphic; and a document display commanding means for providing an instruction that instructs the document display means to simultaneously display the texts and the predetermined graphic.

2. A document processor as claimed in claim 1, further comprising:

a link data designating means for designating the predetermined graphic and providing a designation instruction that instructs the document gain means to gain the link data segment from the document storage device;

wherein the document display commanding means provides a display instruction that instructs the document display means to display the link data segment in place of the predetermined graphic.

3. A document processor as claimed in claim 2, further comprising a suspension commanding means for providing a suspension instruction to instruct the document gain means to suspend gaining of the link data segment when it has been determined, during gaining of the link data segment by the document gain means, that the attribute of the link data segment corresponds to a degree of importance of not more than a predetermined value.

4. A document processor as claimed in claim 2, further comprising a suspension commanding means for providing a suspension instruction to instruct the document gain means to suspend gaining of the link data segment when it has been determined, during gaining of the link data segment by the document gain means, that the attribute of the link data segment corresponds to a degree of importance of not less than a predetermined value.

5. A document processor as claimed in claim 1, further comprising:

a document analysis means for providing an analysis instruction that instructs the document gain means to gain the link data segment from the document storage device when the degree of importance of the link data segment is not less than a predetermined value;

wherein the document display commanding means provides a display instruction that instructs the document display means to display the link data segment in place of the predetermined graphic.

6. A document processor as claimed in claim 1, further comprising:
   a document analysis means for providing analysis instruction that instructs the document gain means to gain the link data segment from the document storage device when the degree of importance of the link data segment is not more than a predetermined value;
   wherein the document display commanding means provides a display instruction that instructs the document display means to display the link data segment in place of the predetermined graphic.

7. A document processor as claimed in claim 1, further comprising:
   a document analysis means for providing analysis instruction that instructs the document gain means to gain the link data segment from the document storage device when the degree of importance of the link data segment is equal to a predetermined value;
   wherein the document display commanding means provides a display instruction that instructs the document display means to display the link data segment in place of the predetermined graphic.

8. A document processor for use with a document storage device capable of storing link data and at least one document comprising texts and link information associated with the link data, the link information including a data link segment, said document processor comprising:
   a document gain means for gaining at least one of a document and link data from the document storage device;
   a temporary document storage means for storing the at least one of the document and the link data;
   a conditional storage means for storing a degree of importance of link data in association with at least one attribute of the link data segment;
   a graphic producing means for producing a predetermined graphic in accordance with the degree of importance of the link data;
   a document display means for displaying texts in the document and the predetermined graphic; and
   a document display commanding means for providing an instruction that instructs the document display means to simultaneously display the texts and the predetermined graphic;
   a decision data gain means for gaining data on conditions for determining a degree of importance of non-text data in response to gain of the non-text data from the document storage device;
   a decision data storage means for storing information corresponding to gain of the data on conditions for determining a degree of importance of non-text data by said decision data gain means; and
   a conditional change means for changing contents of the conditional storage means when contents of the decision data storage means have satisfied predetermined conditions.

9. A document processor as claimed in claim 8, further comprising:
   a link data designating means for designating the predetermined graphic and providing a designation instruction that instructs the document gain means to gain the link data segment from the document storage device;
   wherein the document display commanding means provides a display instruction that instructs the document display means to display the link data segment in place of the predetermined graphic.

10. A document processor as claimed in claim 9, further comprising a suspension commanding means for providing a suspension instruction to instruct the document gain means to suspend gaining of the link data segment when it has been determined, during gaining of the link data segment by the document gain means, that the attribute of the link data segment corresponds to a degree of importance of not more than a predetermined value.

11. A document processor as claimed in claim 9, further comprising a suspension commanding means for providing a suspension instruction to instruct the document gain means to suspend gaining of the link data segment when it has been determined, during gaining of the link data segment by the document gain means, that the attribute of the link data segment corresponds to a degree of importance of not less than a predetermined value.

12. A document processor as claimed in claim 8, further comprising:
   a document analysis means for providing an analysis instruction that instructs the document gain means to gain the link data segment from the document storage device when the degree of importance of the link data segment is not less than a predetermined value;
   wherein the document display commanding means provides a display instruction that instructs the document display means to display the link data segment in place of the predetermined graphic.

13. A document processor as claimed in claim 8, further comprising:
   a document analysis means for providing an analysis instruction that instructs the document gain means to gain the link data segment from the document storage device when the degree of importance of the link data segment is not more than a predetermined value;
   wherein the document display commanding means provides a display instruction that instructs the document display means to display the link data segment in place of the predetermined graphic.

14. A document processor as claimed in claim 8, further comprising:
   a document analysis means for providing an analysis instruction that instructs the document gain means to gain the link data segment from the document storage device when the degree of importance of the link data segment is equal to a predetermined value;
   wherein the document display commanding means provides a display instruction that instructs the document display means to display the link data segment in place of the predetermined graphic.

* * * * *